US006658076B1

(12) United States Patent
Hayata

(10) Patent No.: US 6,658,076 B1
(45) Date of Patent: Dec. 2, 2003

(54) RECEIVER AND METHOD FOR RECEIVING SPREAD SPECTRUM SIGNAL BY ESTIMATING TRANSMITTED SYMBOL RATE

(75) Inventor: Toshihiro Hayata, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/487,892

(22) Filed: Jan. 19, 2000

(30) Foreign Application Priority Data

Jan. 20, 1999 (JP) .......................................... 11-011779

(51) Int. Cl.[7] .............................. H04L 23/00; H04B 1/69
(52) U.S. Cl. ........................................ 375/377; 375/147
(58) Field of Search ................................. 375/147, 377, 375/262, 331–341, 281, 225, 150; 714/786; 370/335

(56) References Cited

U.S. PATENT DOCUMENTS

| 5,544,156 | A | * | 8/1996 | Teder et al. ................ 370/342 |
| 5,581,575 | A | * | 12/1996 | Zehavi et al. ............... 375/142 |
| 5,642,377 | A | * | 6/1997 | Chung et al. ............... 375/145 |
| 5,978,428 | A | * | 11/1999 | Hayashi ...................... 375/377 |
| 6,167,079 | A | * | 12/2000 | Kinnunen et al. .......... 375/225 |
| 6,389,067 | B1 | * | 5/2002 | Riddle et al. ............... 375/225 |

FOREIGN PATENT DOCUMENTS

| JP | 9-172428 | | 6/1997 |
| JP | 10-164009 | | 6/1998 |
| JP | 11-17650 | | 1/1999 |
| JP | 11-150522 | | 6/1999 |
| JP | 11-234188 | | 8/1999 |
| KR | 99-4496 A | | 1/1999 |
| KR | 99-4496 | * | 1/1999 |

OTHER PUBLICATIONS

Okumura, et al., "Variable Rate Data Transmission on Single Code–channel in DS–CDMA", NTT Mobile Communications Network Inc., Feb. 27, 1996, vol. 95, No. 542, pp. 55–60.

Okumura, et al., "Blind Variable Rate Detection Using Viterbi Decoding Path–metric in Coherent DS–CDMA", NTT Mobile Communications Network Inc., Nov. 14, 1996, vol. 96, No. 354, pp. 17–23.

Okumura, et al., "Blind Variable Rate Data Transmission Using Tree–structured Orthogonal code sequence In DS–CDMA", NTT Mobile Communications Network Inc., Oct. 16, 1997, vol. 97, No. 322, pp. 7–13.

Okumura, et al., "Blind Rate Detection using Repetition Code in DS–CDMA Variable Rate Data Transmission", NTT Mobile Communications Network Inc., Sep. 3–6, 1997, p. 296.

Okumura, et al., "Blind Rate Detection of Variable Rate Data Transmission in DS–CDMA", NTT Mobile Communications Network Inc., Sep. 18–21, 1996, p. 304.

Okumura, et al., "Blind Control for Variable Rate Data Transmission in DS–CDMA", NTT Mobile Communications Network, Inc., Sep. 5–8, 1995, p. 371.

* cited by examiner

Primary Examiner—Stephen Chin
Assistant Examiner—Lawrence Williams
(74) Attorney, Agent, or Firm—Foley & Lardner

(57) ABSTRACT

In a spread spectrum receiver, a first despread signal is produced by a despreading circuit corresponding to a first symbol rate. The despreading circuit is responsive to a command signal for subsequently producing a second despread signal corresponding to the second symbol rate. A symbol rate estimation circuit is provided for estimating, from the first despread signal, the transmitted symbol rate of the spread spectrum signal as one of the first and second symbol rates. If the transmitted symbol rate is estimated as the first symbol rate, the despreading circuit continues producing the first despread signal. If the transmitted symbol rate is estimated as the second symbol rate, the estimation circuit supplies the command signal to the despreading circuit to produce the second despread signal. A decoding circuit decodes the first and second despread signals.

19 Claims, 4 Drawing Sheets

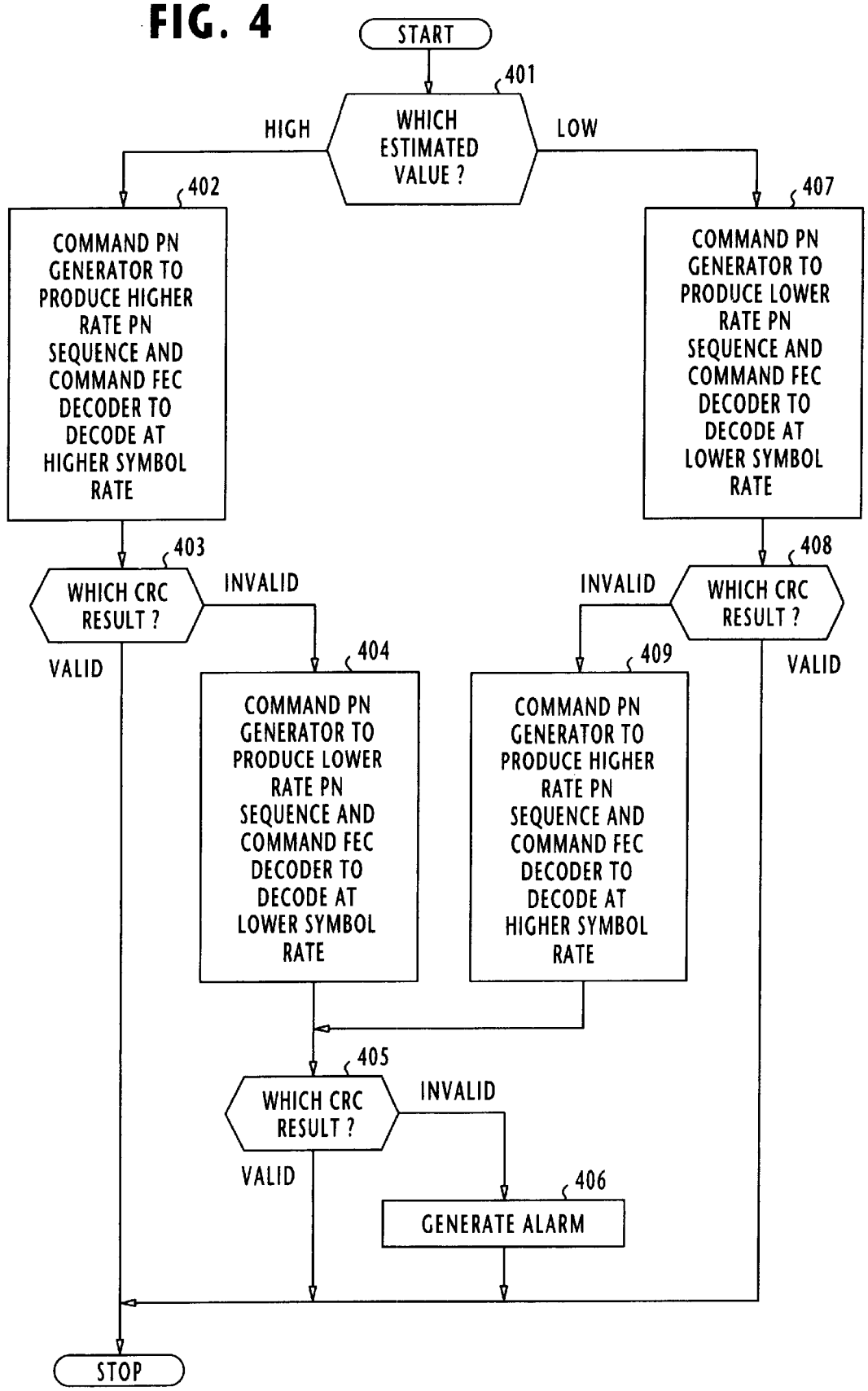

RECEIVER AND METHOD FOR RECEIVING SPREAD SPECTRUM SIGNAL BY ESTIMATING TRANSMITTED SYMBOL RATE

BACKGROUND OF THE INVENTION

1. Field of the Invention

The present invention relates generally to CDMA receivers and CDMA receiving methods. In particular, the present invention relates to a CDMA receiver in which blind rate transmission is used and the pseudonoise (PN) codes used for spreading at transmit sites and those used for despreading at receive sites are structured in hierarchical order.

2. Description of the Related Art

In a spread spectrum channel, receiving and demodulating a signal that has been subject to spread spectrum modulation requires that the same pseudonoise (PN) code sequence be generated in the receiver, and correlated with received signals to extract data symbol values. These PN code sequences are hierarchically structured so that a PN code sequence corresponding to a low symbol rate can be determined from a PN code sequence corresponding to a higher symbol rate. Spread spectrum signals are transmitted at a symbol rate which is selected from a plurality of predetermined symbol rates so that the symbol rate selected for a given frame may differ from the rate used in another frame. No information is transmitted to receivers regarding the transmitted symbol rate. Rather, it is up to the receivers to determine the transmitted symbol rate. This mode of transmission is called blind-rate transmission.

In the current blind-rate transmission where two symbol rates are used, the transmitted spread spectrum signal is correlated, at a receive site, with a PN code sequence that corresponds to the high symbol rate to produce a first despread signal and the despread signal is decoded and tested for error. If an error is detected, a second despread signal is produced corresponding to the lower symbol rate and decoded and tested again. If an error is detected again, an alarm is given. Since the transmitted symbol rate is unknown, the receiver would frequently attempt to repeat the decoding process whenever the transmitted symbol rate varies from one frame to another. Since the decoding process is usually provided by a forward error correction (FEC) decoder which is complex, the frequent attempts to decode despread signals place a significant burden on the FEC decoder, resulting in an increase both in decoding time and power consumption. This is particularly disadvantageous for mobile spread spectrum receivers.

SUMMARY OF THE INVENTION

It is therefore an object of the present invention to provide a spread spectrum receiver and method that reduces the number of decoding processes.

The stated object is attained by estimating the transmitted symbol rate from a received spread spectrum signal.

According to a first aspect, the present invention provides a spread spectrum receiver for receiving a spread spectrum signal transmitted at one of first and second symbol rates, comprising. despreading circuitry for receiving the spread spectrum signal and initially producing therefrom a first despread signal corresponding to the first symbol rate, the despreading circuitry being responsive to a command signal for subsequently producing a second despread signal corresponding to the second symbol rate, symbol rate estimation circuitry for estimating, from the first despread signal, the transmitted symbol rate of the received spread spectrum signal as one of the first and second symbol rates and causing the despreading circuitry to continue producing the first despread signal if the transmitted symbol rate is estimated as the first symbol rate and supplying the command signal to the despreading circuitry if the transmitted symbol rate is estimated as the second symbol rate, and decoding circuitry for decoding the first and second despread signals produced by the despreading circuitry.

According to a second aspect, the present invention provides a method of receiving a spread spectrum signal transmitted at one of first and second symbol rates, comprising the steps of (a) despreading the spread spectrum signal to initially produce a first despread signal corresponding to the first symbol rate, (b) estimating, from the first despread signal, the transmitted symbol rate of the received spread spectrum signal as one of the first and second symbol rates, (c) repeating the step (a) if the transmitted symbol rate is estimated as the first symbol rate, (d) producing a second despread signal corresponding to the second symbol rate if the transmitted symbol rate is estimated as the second symbol rate, and (e) decoding the first and second despread signals.

According to a third aspect, the present invention provides a method of receiving a spread spectrum signal transmitted at one of first and second symbol rates, comprising the steps of (a) producing a first despread signal corresponding to the first symbol rate from the received spread spectrum signal, (b) estimating, from the first despread signal, the transmitted symbol rate of the received spread spectrum signal as one of the first and second symbol rates, (c) if the transmitted symbol rate is estimated as the first symbol rate, repeating the step (a), (d) decoding the first despread signal and performing a test on the decoded signal, (e) if the test indicates that the decoded signal is invalid, producing a second despread signal corresponding to the second symbol rate, (f) decoding the second despread signal and performing a test on the decoded signal, (g) if the transmitted symbol rate is estimated as the second symbol rate, producing the second despread signal, and repeating the step (f), and (h) if the test indicates that the decoded signal is invalid, producing the first despread signal from the received spread spectrum signal, and decoding the first despread signal.

BRIEF DESCRIPTION OF THE DRAWINGS

The present invention will be described in further detail with reference to the accompanying drawings, in which:

FIG. 4 is a flowchart of the operation of the controller of FIG. 3.

DETAILED DESCRIPTION

At a transmit site of a spread spectrum communication system, spreading PN codes are used for spread spectrum modulation of transmit data symbols. The PN codes are structured in hierarchical order so that a spreading code whose code length equals the symbol length of lower-rate symbols can be determined from a spreading code whose code length equals the symbol length of higher-rate symbols.

Figure 1:
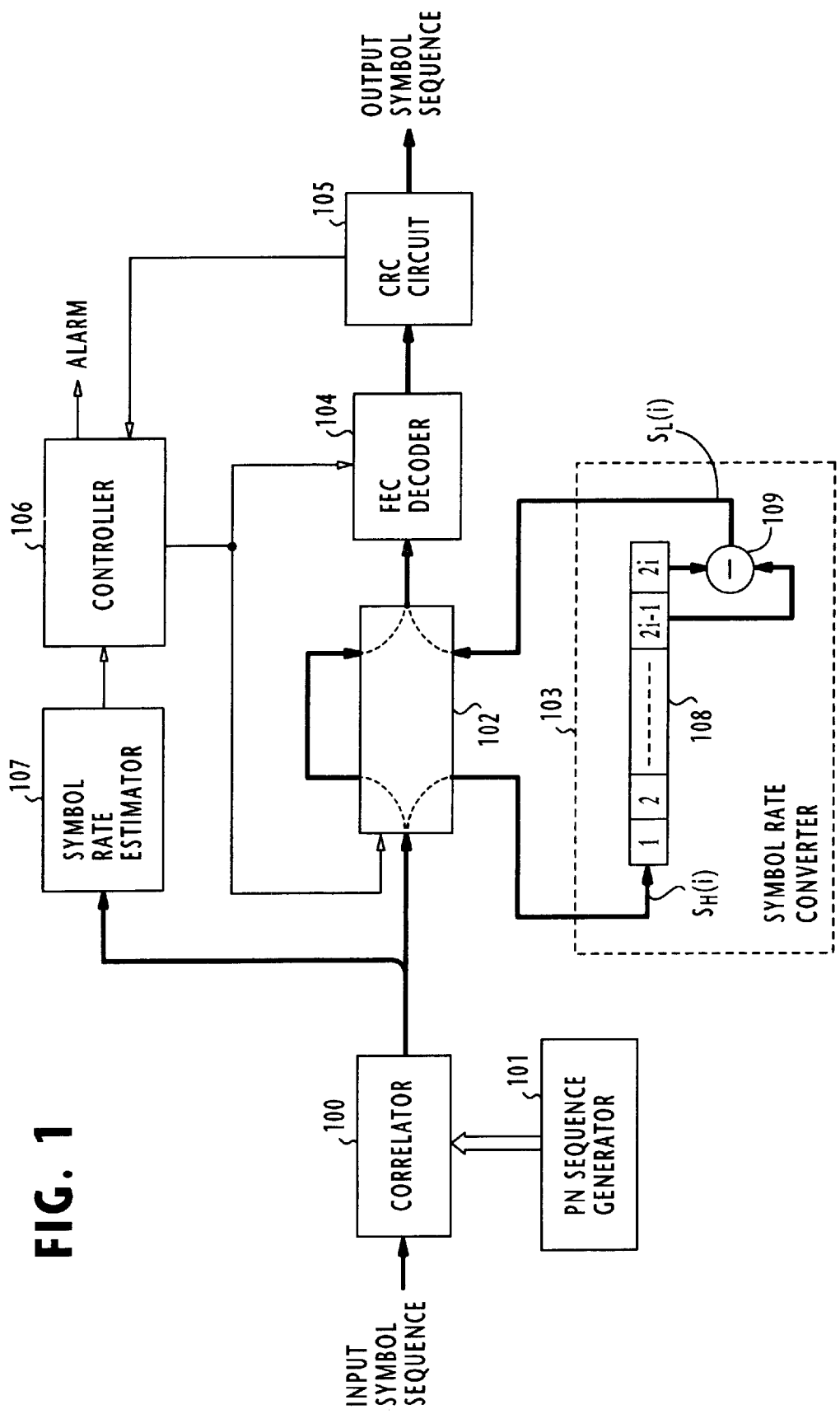
FIG. 1 is a block diagram of a CDMA receiver according to a first embodiment of the present invention.

A CDMA receiver of the present invention is shown in FIG. 1 as a receive site of the spread spectrum communication system to receive a digitally demodulated, spread spectrum signal. In a typical example, this signal has been subject to spread spectrum modulation using one of two predetermined spreading pseudonoise (PN) codes whose code lengths are equal to the symbol lengths of high- and low-rate symbols, respectively. Because of the hierarchical organized PN code sequences, the higher symbol rate is twice as high as the lower symbol rate. If 64 kilosymbols per second (ksps) is used for the higher rate then the lower symbol rate is 32 ksps. The spread spectrum signal is subject to digital modulation such as phase shift keying and the digitally modulated signal is transmitted. At the receive site, the transmitted signal undergoes digital demodulation.

In FIG. 1, the CDMA receiver includes a correlator 100, where the digitally demodulated signal is despread and correlated with a despreading PN code sequence supplied from a PN code generator 101. Correlator 100 determines a symbol value of the despread signal, representing the correlation of the input symbol with the PN code. The output of the correlator 100 is supplied to a forward error correction (FEC) decoder 104 through one of two ways, one via a direct route connected between the higher positions of a switch 102 and the other through a symbol rate converter 103 connected between the lower positions of the switch 102.

FEC decoder 104 decodes the input signal at one of the high and low symbol rates. A cyclic redundant check (CRC) test circuit 105 is connected to the FEC decoder 104 to test for the presence or absence of an error in the decoded signal.

Switch 102 and the FEC decoder 104 are controlled by a controller 106 according the result of the test from the CRC test circuit 105.

According to the present invention, the controller 106 further responds to the output of a symbol rate estimator 107 for controlling the switch 102 and decoder 104. Symbol rate estimator 107 is connected to the output of correlator 100 to provide estimation of the transmitted symbol rate based on power values of a frame signal transmitted at the higher rate of the system, i.e., 64 ksps, derived from the symbol values $S_H$ of the high symbol rate frame signal.

The power value A of a 64-ksps frame is given by Equation (1) and the power value B of a 32-ksps frame is given by Equation (2), as follows:

$$A = \sum_{i=0}^{2N} \{S_H(i)\}^2 \quad (1)$$

$$B = \sum_{i=0}^{N-1} [\{S_H(2\times i) - S_H(2\times i+1)\}/2]^2 \quad (2)$$

where i represents the i-th symbol and N is the total number of symbols transmitted by a frame. Power value A is multiplied by a factor α which is greater than 0 and equal to or smaller than 0.5.

Symbol rate estimator 107 compares the product α×A with the power value B and determines the transmitted symbol rate according to the result of the comparison as follows:

(1) If α×A is smaller than the power value B, the transmitted symbol rate is estimated as 32 ksps, and
(2) If α×A is equal to or greater than B, the transmitted symbol rate is estimated as 64 ksps.

Alternatively, consider a function of U(x), where $x=S_H(2\times i)\times S_H(2\times i+1)$. Note that U(x)=1, if $x \geq 0$ and U=0, if x<0.

The function U(x) is a parameter indicating an amount by which the transmitted symbols are aligned in phase with the 32-ksps symbols. Symbol rate estimation is based on the summation of the function U(x) with respect to all symbols transmitted in a frame interval to obtain a phase alignment value as given by Equation (3).

$$C = \sum_{i=0}^{N-1} U\{(S_H(2\times i) \times S_H(2\times i+1)\} \quad (3)$$

It is seen that the phase alignment value C is small if the transmitted symbol rate is high, and large otherwise. Specifically, the phase alignment value C is compared with a reference value β (where 0<β≦N), and the estimator 107 produces the following results:

(3) If C is smaller than β, the transmitted symbol rate is estimated as 64 ksps, and
(4) If C is equal to or greater than β, the transmitted symbol rate is estimated as 32 ksps.

In the illustrated embodiment, the transmitted spread spectrum signal has been subject to PN modulation using one of two spreading codes corresponding respectively to the 64 ksps and 32 ksps symbol rates. On the other hand, the despreading PN. code sequence provided by the generator 101 to the correlator 100 is one that corresponds to the higher symbol rate.

If the symbol rate estimator 107 determines that the transmitted symbol rate is high, the controller 106 sets the switch 102 to the higher positions for coupling the output of correlator 100 direct to the FEC decoder 104. If the symbol rate estimator 107 determines that the transmitted symbol rate is low, the controller 106 sets the switch 102 to the lower positions for coupling the output of correlator 100 to the symbol rate converter 103.

By denoting the value of the i-th symbol of the 64-ksps transmission as $S_L(i)$ and the value of the i-th symbol of the 32-ksps transmission as $S_H(i)$, the following equation holds:

$$S_L(i)=S_H(2\times i)-S_H(2\times i-1) \quad (4)$$

Equation (4) indicates that the symbol value of the lower rate transmission can be determined from the symbol value of the higher rate transmission. As shown in FIG. 1, the symbol rate converter 103 includes a shift register 108 and a subtractor 109 to implement Equation (4). Specifically, when the symbol values $S_H(0)$ to $S_H(2i)$ from the correlator 100 are stored in the shift register 108, the difference between symbol values $S_H(2i)$ and $S_H(2i-1)$ is determined by the subtractor 109 as a lower rate symbol value $S_L(i)$.

Figure 2:
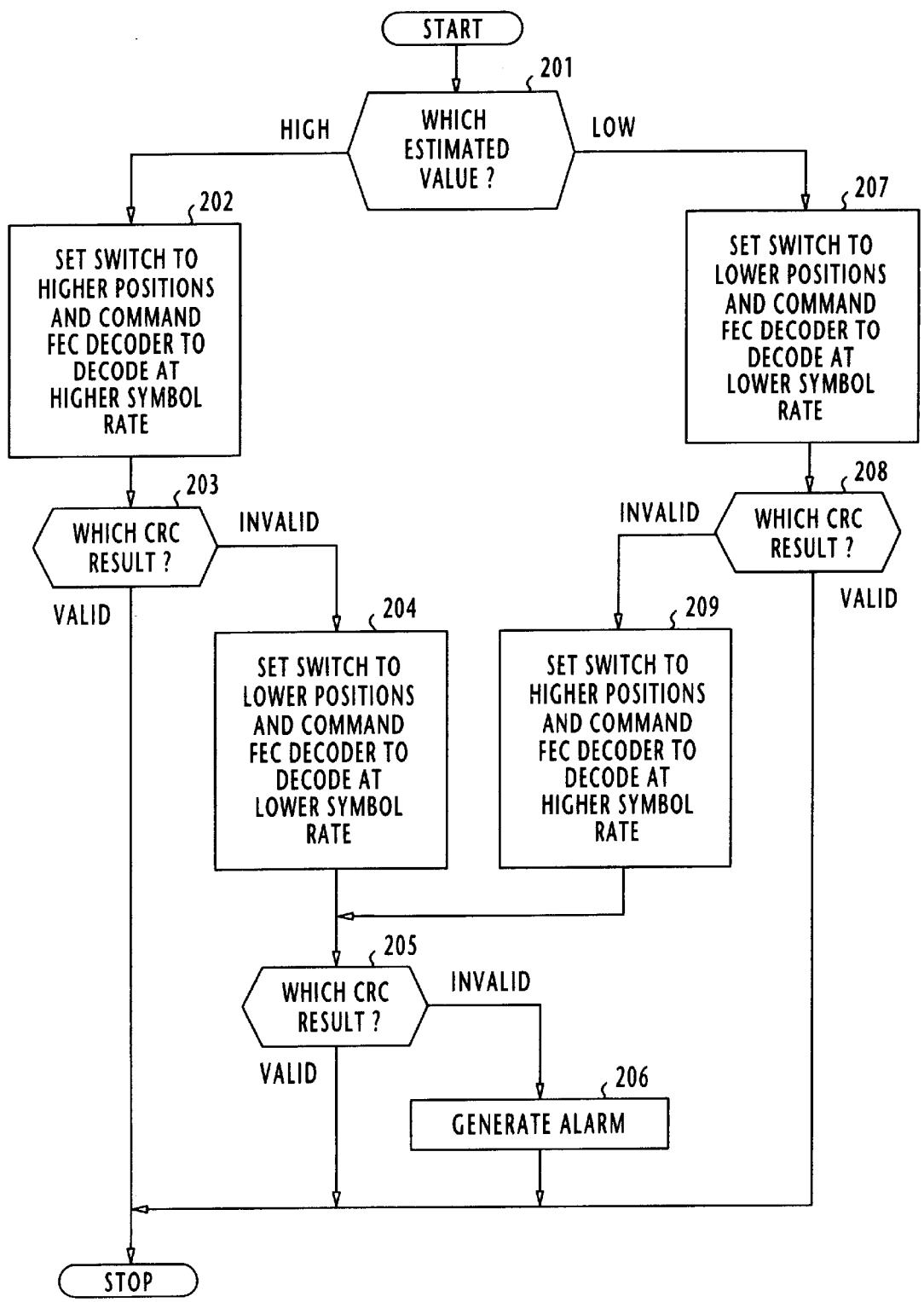
FIG. 2 is a flowchart of the operation of the controller of FIG. 1.

The operation of the controller 106 will now be described in detail below with the aid of a flowchart shown in FIG. 2.

Controller 106 monitors the output of symbol rate estimator 107 and determines whether the estimated symbol rate is high or low (step 201).

If the estimated symbol rate is the higher rate value, flow proceeds to step 202 to set the switch 102 to the higher positions and command the FEC decoder 104 to decode the output of correlator 100 at the higher symbol rate. The signal decoded at the higher rate is then CRC tested by the test circuit 105.

Controller 106 proceeds to step 203 to check to see if the result of the CRC test is a valid or an invalid indication. If the test indicates that no error exists in the decoded signal, the latter is delivered from the CRC test circuit 105 to the output terminal of the receiver and the controller terminates the routine.

If the CRC test indicates that an error is detected in the decoded symbols, flow proceeds from step 203 to step 204 to set the switch 102 to the lower positions and command the FEC decoder 104 to decode the output of the symbol rate converter 103 at the lower symbol rate. The signal decoded at the lower rate is then CRC tested by the test circuit 105.

Controller 106 proceeds from step 204 to step 205 to check the result of the CRC test to see if the decoding at the lower symbol rate produces a valid or invalid output sequence. If no error exists in the decoded signal, the latter is delivered to the output terminal of the receiver and the controller 106 terminates the routine. If an error is detected in the decoded signal, it is determined that the receiver has failed to decode the transmitted signal and controller 106 proceeds from step 205 to step 206 to generate an alarm before terminating the routine.

Returning to step 201, if the estimated symbol rate is the lower rate value, controller 106 proceeds to step 207 to set the switch 102 to the lower positions and command the FEC decoder 104 to decode the output of symbol rate converter 103 at the lower symbol rate. The signal decoded at the lower rate is then CRC tested by the test circuit 105.

Controller 106 proceeds to step 208 to check to see if the result of the CRC test is a valid or an invalid indication. If the test indicates that no error exists in the decoded signal, the latter is delivered from the CRC test circuit 105 to the output terminal of the receiver and the controller terminates the routine. If the CRC test indicates that an error is detected in the decoded symbols, flow proceeds from step 208 to step 209 to set the switch 102 to the higher positions and command the FEC decoder 104 to decode the output of the correlator 100 at the higher symbol rate. The signal decoded at the higher rate is then CRC tested by the test circuit 105.

Controller 106 proceeds from step 209 to step 205 to check the result of the CRC test to see if the decoding at the higher symbol rate produces a valid or invalid output sequence. If no error exists in the signal decoded at the higher rate, the latter is delivered to the output terminal of the receiver and the controller 106 terminates the routine. If an error is detected in the decoded signal, it is determined that the receiver has failed to decode the transmitted signal and controller 106 proceeds from step 205 to step 206 to generate an alarm before terminating the routine.

Figure 3:
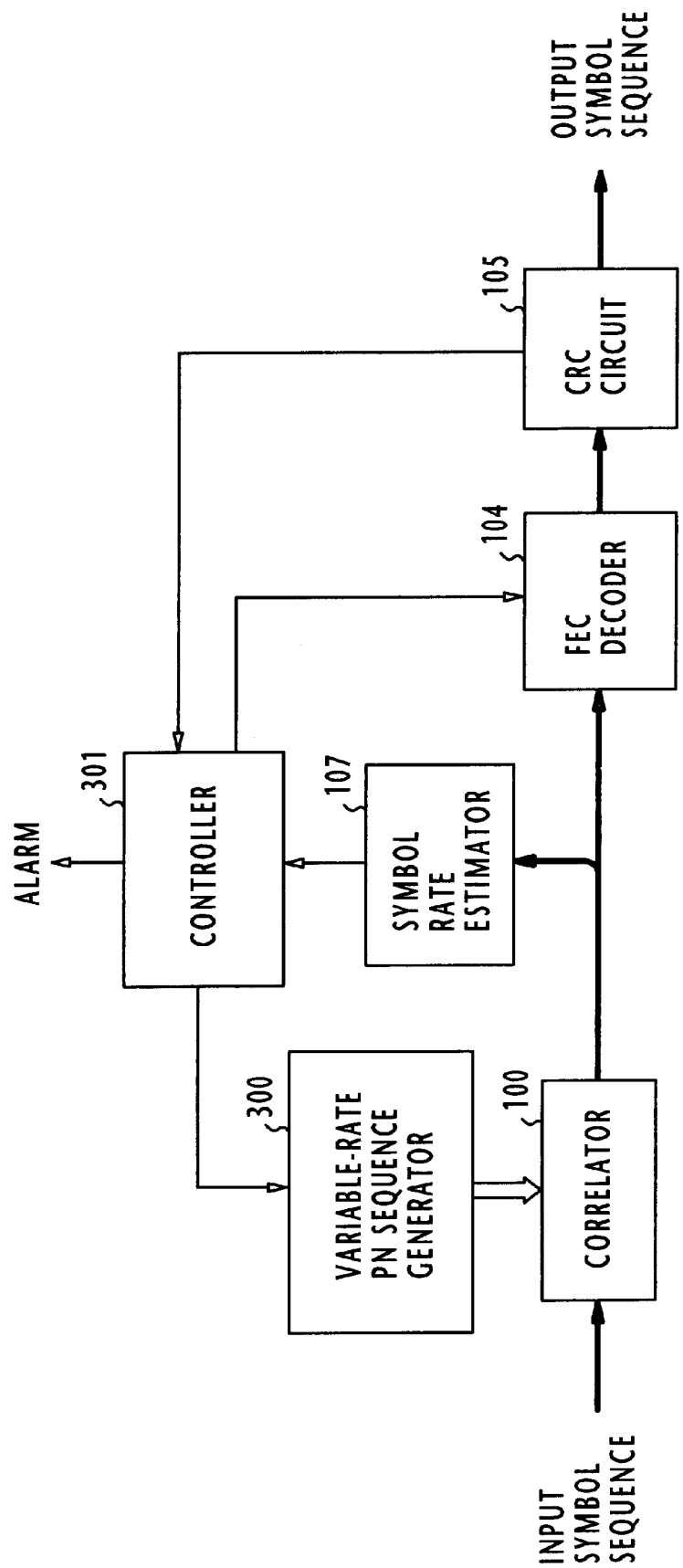
FIG. 3 is a block diagram of a CDMA receiver according to a second embodiment of the present invention.

FIG. 3 is a block diagram of a modified embodiment of the present invention in which elements corresponding in significance to those in FIG. 1 are marked with the same numerals. In this modification, a variable-rate PN sequence generator 300 is provided, instead of the PN sequence generator 101 and symbol rate converter 103 of the previous embodiment, to supply one of the 64-ksps and 32-ksps symbol rates associated PN code sequences to the correlator 100. Controller 301 controls the variable-rate PN sequence generator 300 according to the output of symbol rate estimator 107 as well as the valid/invalid result indication of the CRC test circuit 105.

The operation of the controller 301 proceeds according to the flowchart shown in FIG. 4.

Controller 301 monitors the output of symbol rate estimator 107 and determines whether the estimated symbol rate is high or low (step 401). If the estimated symbol rate is the higher rate value, flow proceeds to step 402 to command the PN sequence generator 300 to supply the higher-rate PN code sequence to the correlator 100 and command the FEC decoder 104 to decode the output of correlator 100 at the higher symbol rate. The signal decoded at the higher rate is then CRC tested by the test circuit 105.

Controller 301 proceeds to step 403 to check to see if the result of the CRC test is a valid or an invalid indication. If the test indicates that no error exists in the decoded signal, the latter is delivered from the CRC test circuit 105 to the output terminal of the receiver and the controller 301 terminates the routine.

If the CRC test indicates that an error is detected in the decoded symbols, flow proceeds from step 403 to step 404 to command the PN sequence generator 300 to supply the lower-rate PN sequence to the correlator 100 and command the FEC decoder 104 to decode the output of the correlator 100 at the lower symbol rate. The signal decoded at the lower rate is then CRC tested by the test circuit 105.

Controller 301 proceeds from step 404 to step 405 to check the result of the CRC test to see if the decoding at the lower symbol rate produces a valid or an invalid output sequence. If no error exists in the decoded signal, the latter is delivered to the output terminal of the receiver and the controller 301 terminates the routine. If an error is detected in the decoded signal, it is determined that the receiver has failed to decode the transmitted signal and controller 301 proceeds from step 405 to step 406 to generate an alarm before terminating the routine.

Returning to step 401, if the estimated symbol rate is the lower rate value, controller 301 proceeds to step 407 to command the PN sequence generator 300 to supply the lower-rate PN sequence to the correlator 100 and command the FEC decoder 104 to decode the output of the correlator 100 at the lower symbol rate. The signal decoded at the lower rate is then CRC tested by the test circuit 105.

Controller 301 proceeds to step 408 to check to see if the result of the CRC test is a valid or an invalid indication. If the test indicates that no error exists in the decoded signal, the latter is delivered from the CRC test circuit 105 to the output terminal of the receiver and the controller terminates the routine. If the CRC test indicates that an error is detected in the decoded symbols, flow proceeds from step 408 to step 409 where the controller 301 commands the PN sequence generator 300 to supply the higher rate PN sequence to the correlator 100 and command the FEC decoder 104 to decode the output of the correlator 100 at the higher symbol rate. The signal decoded at the higher rate is then CRC tested by the test circuit 105.

Controller 301 proceeds from step 409 to step 405 to check the result of the CRC test to see if the decoding at the higher symbol rate produces a valid or invalid output sequence. If no error exists in the signal decoded at the higher rate, the latter is delivered to the output terminal of the receiver and the controller 301 terminates the routine. If an error is detected in the decoded signal, it is determined that the receiver has failed to decode the transmitted signal and controller 106 proceeds from step 405 to step 406 to generate an alarm before terminating the routine.

What is claimed is:

1. A spread spectrum receiver for receiving a spread spectrum signal transmitted at one of first and second symbol rates, comprising:

despreading circuitry for receiving said spread spectrum signal and initially producing therefrom a first despread signal corresponding to said first symbol rate, the despreading circuitry being responsive to a command signal for subsequently producing a second despread signal corresponding to said second symbol rate;

symbol rate estimation circuitry for estimating, from said first despread signal, the transmitted symbol rate of the received spread spectrum signal as one of said first and second symbol rates and causing said despreading circuitry to continue producing said first despread signal if the transmitted symbol rate is estimated as said first symbol rate and supplying said command signal to said despreading circuitry if the transmitted symbol rate is estimated as said second symbol rate; and decoding circuitry for decoding the first and second despread signals produced by said despreading circuitry;

wherein said despreading circuitry comprises:

correlation circuitry for correlating said received spread spectrum signal with a first pseudonoise (PN) sequence to produce said first despread signal or with a second PN sequence to produce said second despread signal, said first and second PN sequences corresponding respectively to said first and second symbol rates; and a variable-rate PN sequence generator for supplying said first PN sequence to said correlation circuitry if the transmitted symbol rate is estimated as said first symbol rate or supplying said second PN sequence to said correlation circuitry if the transmitted symbol rate is estimated as said second symbol rate.

2. A spread spectrum receiver as claimed in claim 1, wherein said first symbol rate is higher than said second symbol rate.

3. A spread spectrum receiver as claimed in claim 1, wherein said first symbol rate is twice as higher as said second symbol rate.

4. A spread spectrum receiver as claimed in claim 1, wherein said symbol rate estimation circuitry is arranged to:

calculate a first power value from the spread spectrum signal transmitted at said first symbol rate and a second power value from the spread spectrum signal transmitted at said second symbol rate, and estimate the transmitted symbol rate depending on relative magnitudes of said first and second power values.

5. A spread spectrum receiver for receiving a spread spectrum signal transmitted at one of first and second symbol rates, comprising:

despreading circuitry for receiving said spread spectrum signal and initially producing therefrom a first despread signal corresponding to said first symbol rate, the despreading circuitry being responsive to a command signal for subsequently producing a second despread signal corresponding to said second symbol rate;

symbol rate estimation circuitry for estimating, from said first despread signal, the transmitted symbol rate of the received spread spectrum signal as one of said first and second symbol rates and causing said despreading circuitry to continue producing said first despread signal if the transmitted symbol rate is estimated as said first symbol rate and supplying said command signal to said despreading circuitry if the transmitted symbol rate is estimated as said second symbol rate; and decoding circuitry for decoding the first and second despread signals produced by said despreading circuitry;

wherein said symbol rate estimation circuitry is arranged to:

calculate a phase alignment parameter indicating to which extent the received spread spectrum signal is aligned in phase with a spread spectrum signal transmitted at said second symbol rate, and estimate the transmitted symbol rate depending on relative magnitudes of said phase alignment parameter and a predetermined reference value.

6. A method of receiving a spread spectrum signal transmitted at one of first and second symbol rates, comprising the steps of:

a) despreading the spread spectrum signal to initially produce a first despread signal corresponding to said first symbol rate;

b) estimating, from said first despread signal, the transmitted symbol rate of the received spread spectrum signal as one of said first and second symbol rates;

c) repeating the step (a) if the transmitted symbol rate is estimated as said first symbol rate;

d) producing a second despread signal corresponding to said second symbol rate if the transmitted symbol rate is estimated as said second symbol rate; and e) decoding the first and second despread signals;

wherein the step (a) comprises the step of correlating said received spread spectrum signal with a first pseudonoise (PN) sequence corresponding to said first symbol rate to produce said first despread signal, and wherein the step (d) comprises the step of correlating said received spread spectrum signal with a second PN sequence corresponding to said second symbol rate to produce said second despread signal if the transmitted symbol rate is estimated as said second symbol rate.

7. The method of claim 6, wherein said first symbol rate is higher than said second symbol rate.

8. The method of claim 6, wherein said first symbol rate is twice as high as said second symbol rate.

9. The method of claim 6, wherein the step (b) comprises the steps of:

calculating a first power value from the spread spectrum signal transmitted at said first symbol rate and a second power value from the spread spectrum signal transmitted at said second symbol rate, and estimating the transmitted symbol rate depending on relative magnitudes of said first and second power values.

10. The method of claim 6, wherein the step (b) comprises:

calculating a phase alignment parameter indicating an amount by which the received spread spectrum signal is aligned in phase with a spread spectrum signal transmitted at said second symbol rate, and estimating the transmitted symbol rate depending on relative magnitudes of said phase alignment parameter and a predetermined reference value.

11. A method of estimating a transmitted symbol rate of a spread spectrum signal, wherein the spread spectrum signal is transmitted at one of first and second predetermined symbol rates and wherein the spread spectrum signal has been subject to pseudonoise (PN) modulation using first and second PN code sequences respectively corresponding to said first and second symbol rates, said first symbol rate being an integral multiple of said second symbol rate, the method comprising the steps of:

calculating a first power value from the spread spectrum signal transmitted at said first symbol rate and a second power value from the spread spectrum signal transmitted at said second symbol rate, and estimating the transmitted symbol rate depending on relative magnitudes of said first and second power values.

12. The method of claim 11, wherein the first and second power values are respectively represented by A and B as follows:

$$A = \sum_{i=0}^{2N} \{S_H(i)\}^2$$

$$B = \sum_{i=0}^{N-1} [\{S_H(2 \times i) - S_H(2 \times i + 1)\}/2]^2$$

wherein $S_H$ indicates a symbol value of the spread spectrum signal transmitted at said first symbol rate, i is an identifier of the symbol value in a frame signal, and N is a total number of symbols contained in the frame signal.

13. A method of estimating a transmitted symbol rate of a spread spectrum signal, wherein the spread spectrum signal is transmitted at one of first and second predetermined symbol rates and wherein the spread spectrum signal has been subject to pseudonoise (PN) modulation using first and second PN code sequences
respectively corresponding to said first and second symbol rates, said first symbol rate being an integral multiple of said second symbol rate, the method comprising the steps of:
calculating a phase alignment parameter indicating an amount by which the received spread spectrum signal is aligned in phase with a spread spectrum signal transmitted at said second symbol rate, and
estimating the transmitted symbol rate depending on relative magnitudes of said phase alignment parameter and a predetermined reference value.

14. The method of claim 13, wherein the phase alignment parameter is represented by C as follows:

$$C = \sum_{i=0}^{N-1} U\{(S_H(2 \times i) \times S_H(2 \times i + 1)\}$$

wherein $S_H$ indicates a symbol value of the spread spectrum signal transmitted at said first symbol rate, i is an identifier of the symbol value in a frame signal, and N is a total number of symbols contained in the frame signal.

15. A spread spectrum receiver as claimed in claim 5, wherein said despreading circuitry comprises:
correlation circuitry for correlating said received spread spectrum signal with a pseudonoise (PN) sequence corresponding to said first symbol rate to produce said first despread signal;
selection and conversion circuitry for selecting the first despread signal of said correlation circuitry if the transmitted symbol rate is estimated by said symbol rate estimation circuitry as said first symbol rate, and converting the symbol rate of said first despread signal from said first symbol rate to said second symbol rate if the transmitted symbol rate is estimated as said second symbol rate to thereby produce said second despread signal.

16. A spread spectrum receiver as claimed in claim 5, wherein said despreading circuitry comprises:
correlation circuitry for correlating said received spread spectrum signal with a first pseudonoise (PN) sequence to produce said first despread signal or with a second PN sequence to produce said second despread signal, said first and second PN sequences corresponding respectively to said first and second symbol rates; and
a variable-rate PN sequence generator for supplying said first PN sequence to said correlation circuitry if the transmitted symbol rate is estimated as said first symbol rate or supplying staid second PN sequence to said correlation circuitry if the transmitted symbol rate is estimated as said second symbol rate.

17. A method of receiving a spread spectrum signal transmitted at one of first and second symbol rates, comprising the steps of:
a) despreading the spread spectrum signal to initially produce a first despread signal corresponding to said first symbol rate;
b) estimating, from said first despread signal, the transmitted symbol rate of the received spread spectrum signal as one of said first and second symbol rates;
c) repeating the step (a) if the transmitted symbol rate is estimated as said first symbol rate;
d) producing a second despread signal corresponding to said second symbol rate if the transmitted symbol rate is estimated as said second symbol rate; and
e) decoding the first and second despread signals;
wherein the step (b) comprises:
calculating a phase alignment parameter indicating an amount by which the received spread spectrum signal is aligned in phase with a spread spectrum signal transmitted at said second symbol rate, and
estimating the transmitted symbol rate depending on relative magnitudes of said phase alignment parameter and a predetermined reference value.

18. A method of receiving a spread spectrum signal transmitted at one of first and second symbol rates, comprising the steps of:
a) producing a first despread signal corresponding to said first symbol rate from the received spread spectrum signal;
b) estimating, from said first despread signal, the transmitted symbol rate of the received spread spectrum signal as one of said first and second symbol rates;
c) if the transmitted symbol rate is estimated as said first symbol rate, repeating the step (a);
d) decoding the first despread signal and performing a test on the decoded signal;
e) if the test indicates that the decoded signal is invalid, producing a second despread signal corresponding to said second symbol rate;
f) decoding the second despread signal and performing a test on the decoded signal;
g) if the transmitted symbol rate is estimated as said second symbol rate, producing said second despread signal, and repeating the step (f); and
h) if the test indicates that the decoded signal is invalid, producing said first despread signal from the received spread spectrum signal, and decoding the first despread signal;
wherein the step (b) comprises:
calculating a phase alignment parameter indicating an amount by which the received spread spectrum signal is aligned in phase with a spread spectrum signal transmitted at said second symbol rate, and
estimating the transmitted symbol rate depending on relative magnitudes of said phase alignment parameter and a predetermined reference value.

19. A method of receiving a spread spectrum signal transmitted at one of first and second symbol rates, comprising the steps of:
a) despreading the spread spectrum signal to initially produce a first despread signal corresponding to said first symbol rate;

b) estimating, from said first despread signal, the transmitted symbol rate of the received spread spectrum signal as one of said first and second symbol rates;
c) repeating the step (a) if the transmitted symbol rate is estimated as said first symbol rate;
d) producing a second despread signal corresponding to said second symbol rate if the transmitted symbol rate is estimated as said second symbol rate; and
e) decoding the first and second despread signals;
   wherein the step (a) comprises the step of correlating said received spread spectrum signal with a pseudonoise (PN) sequence corresponding to said first symbol rate to produce said first despread signal, and
   wherein the step (d) comprises the step of converting the symbol rate of said first despread signal from said first symbol rate to said second symbol rate if the transmitted symbol rate is estimated as said second symbol rate to thereby produce said second despread signal; and
wherein the step (b) comprises:
   calculating a phase alignment parameter indicating an amount by which the received spread spectrum signal is aligned in phase with a spread spectrum signal transmitted at said second symbol rate, and
   estimating the transmitted symbol rate depending on relative magnitudes of said phase alignment parameter and a predetermined reference value.

* * * * *